United States Patent [19]

Chiro

[11] Patent Number: 4,612,854
[45] Date of Patent: Sep. 23, 1986

[54] NUTCRACKER APPARATUS

[76] Inventor: Henry J. Chiro, 32161 Pea Ridge Rd., Albany, La. 70711

[21] Appl. No.: 613,625

[22] Filed: May 24, 1984

[51] Int. Cl.$^4$ .............................................. A23N 5/00
[52] U.S. Cl. ...................................... 99/579; 99/581;
100/233; 100/295
[58] Field of Search ................. 99/568, 570, 571, 572,
99/577, 578, 579, 580–582; 100/193–195, 266,
295, 292, 293, 299, 214, 233; 30/120.1–120.5;
426/482, 481

[56] References Cited
U.S. PATENT DOCUMENTS
4,182,226  1/1980  Sigas ...................................... 99/578

Primary Examiner—Timothy F. Simone
Attorney, Agent, or Firm—Pravel, Gambrell, Hewitt & Kimball

[57] ABSTRACT

A nutcracker having a horizontal base and a horizontal lower cracking plate removably positioned on the base. An upper cracking plate is horizontally disposed above the lower cracking plate and slidably engaged on an upper frame for supporting the upper cracking plate above the lower cracking plate and allowing vertical and horizontal movement of the upper cracking plate relative to the base and lower cracking plate.

9 Claims, 5 Drawing Figures

NUTCRACKER APPARATUS

BACKGROUND OF THE INVENTION

1. Field of the Invention

The present invention relates to nutcrackers and more particularly relates to nutcrackers having horizontally opposed flat surfaces which crack the nuts therebetween by increased pressure and rolling of the nuts.

2. General Background

In cracking nuts, it is often desirable and convenient to be able to crack more than one nut at a time. It is also convenient for easy pealing and shelling of the nuts if the nuts are cracked substantially completely around their circumference. Nutcrackers utilizing opposing flat surfaces of which applicant is aware include the following:

U.S. Pat. No. 2,663,340, issued to Goodwin, entitled "Nut Huller And Sheller", teaches the use of an apparatus whereby the nuts are deposited into a shoot and rolled between two plate surfaces as one of the plate surfaces moves in a rotating fashion. One of the plates is angled relative to the second plate to provide a decreasing area between the plates for applying the pressure over the outer surface of the nuts.

U.S. Pat. No. 4,009,651, issued to Adams, entitled "Nutcracker" teaches an apparatus wherein a nut is positioned in a nutcracking chamber with the lever being brought down on the nut and an adjusting screw being provided to allow for adjustment of the distance that the lever will move down into the nut as the nut is cracked. There is also shown a tray wherein upon raising the lever, the cracked nut is removed from the chamber. Although the nut is cracked between two opposing surfaces, this does not teach rolling of the nuts in addition to pressure and the chamber is for the purpose of preventing the spreading of the cracked shell of the nuts around the area.

SUMMARY OF THE INVENTION

What is provided is a nutcracker having a horizontal base, a horizontal lower cracking plate removably positioned on the base, an upper cracking plate horizontally disposed above the lower cracking plate and a frame for supporting the upper cracking plate above the lower cracking plate and allowing vertical and horizontal movement of the upper cracking plate relative to the base and lower cracking plate.

In view of the above, it is an object of the invention to provide a nutcracker capable of cracking a plurality of nuts at one time.

It is another object of the invention to provide a nutcracker which cracks substantially all of the outer circumference of the nuts being cracked.

In view of the above objects, it is a feature of the invention to provide a nutcracker with horizontally disposed upper and lower cracking plates.

It is another feature of the invention to provide cracking plates which cause downward and horizontal pressure to be placed on the nuts being cracked.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE INVENTION

Figure 1:
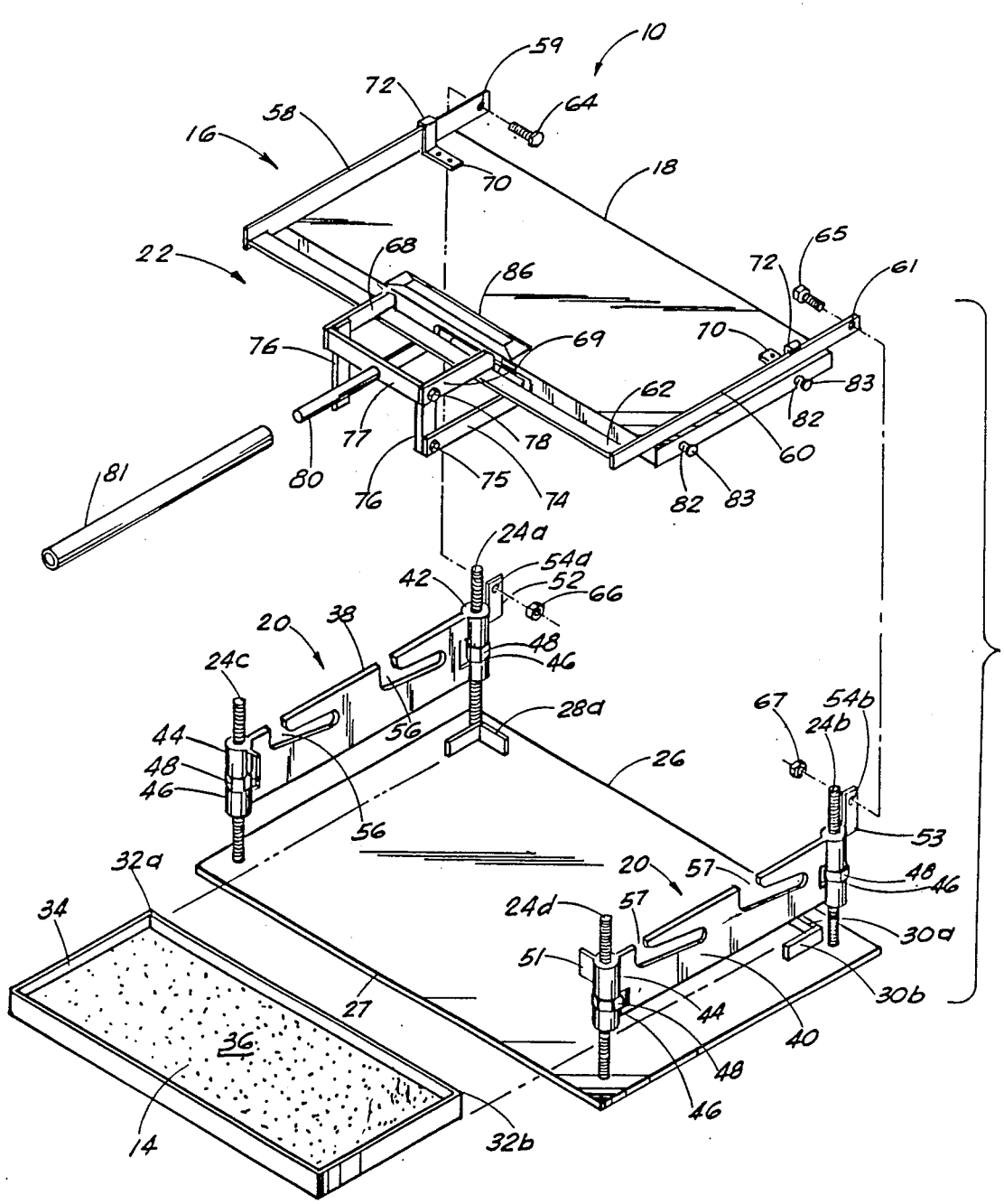
FIG. 1 is an exploded view of the invention.

Referring now to the drawings, it can be seen that the apparatus is generally referred to by the numeral 10. As seen in FIG. 1, nutcracker 10 is comprised generally of base 12, lower cracking plate 14, upper frame 16, upper cracking plate 18, means 20 for adjustably supporting frame 16 and upper cracking plate 18 above base 12 and means 22 for causing movement of upper cracking plate 18 relative to upper frame 16 and lower cracking plate 14.

As best seen in FIG. 1, base 12 is substantially flat and rectangular shaped. In the preferred embodiment, base 12 is constructed of a rigid material such as metal or wood. Positioned adjacent each corner of base 12 and extending upwardly therefrom are studs 24. Studs 24 are threaded and are rigidly attached to base 12. Studs 24 may be attached to base 12 by any appropriate means such as welding if base 12 is constructed of metal or by threaded engagement if base 12 is constructed of wood. Rigidly attached adjacent the forward end 26 of base 12 are flanges 28 and 30. As best seen in FIG. 1, flanges 28 and 30 are rigidly attached to base 12 interior of studs 24A and 24B respectively. Flanges 28 and 30 are comprised of forward portions 28A and 30A which extend substantially parallel to forward edge 26 of base 12 and side portions 28B and 30B which are rigidly connected to forward portions 28A and 30A to form a right angle.

As seen in FIG. 1, lower cracking plate 14 is substantially rectangular in shape and sized so that it may be positioned on base 12 between bolts 24 and so that the forward corners 32A and 32B abut flanges 28 and 30 on base 12. In the preferred embodiment, lower cracking plate 14 is provided with flange 34 around the outer edge which extends above the surface of lower cracking plate 14 to prevent the nuts to be cracked from rolling off of lower cracking plate 14 during loading and cracking operations. In the preferred embodiment, lower cracking plate 14 may be constructed of any suitable rigid material such as metal or wood and is provided with textured surface 36 on the upper surface thereof to prevent sliding of the nuts during the cracking operation by providing a gripping action to enhance the rolling effect created by upper cracking plate 18, to be discussed at a later point.

Figure 2:
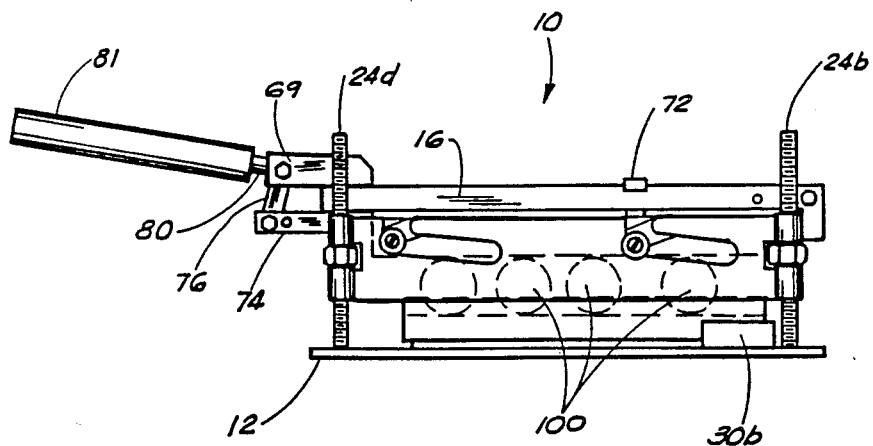
FIG. 2 is a side view of the invention illustrating the upper cracking plate and frame in position above the nuts to be cracked prior to downward pressure being placed upon the handle.
Figure 3:
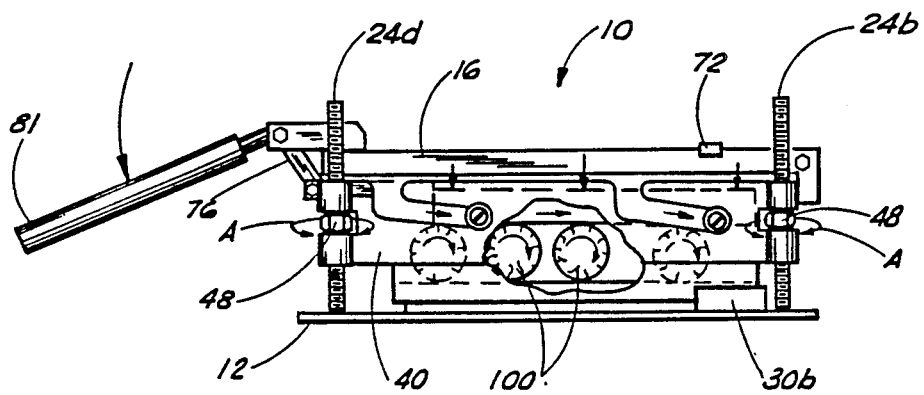
FIG. 3 is a side view of the invention illustrating the downward pressure and rolling motion created when downward pressure is provided on the handle.

As best seen in FIG. 1, means 20 for adjustably supporting upper frame 16 and upper cracking plate 18 above base 12 and lower cracking plate 14 is provided on threaded studs 24. Means 20 is comprised generally of vertical side plates 38 and 40 adjustably engaged with threaded studs 24A, 24C and 24B, 24D respectively. Vertical side plates 38 and 40 are provided with an enlarged portion 42 at the forward end thereof and enlarged portion 44 at the rear ends thereof. Enlarged portions 42 and 44 are provided with a longitudinal bore not shown therethrough to slideably receive threaded studs 24. Forward enlarged portions 42 of vertical side plates 38 and 40 are provided at substantially the center thereof with notch 46 for receiving nut 48 within notch 46. Likewise, enlarged portions 44 at the rear of vertical plates 38 and 40 are also provided with notch 46 for receiving nut 48. Thus, vertical side plate 38 is adapted to be slidably received by threaded studs 24A and 24C such that nuts 48 allow upward and downward adjustment of vertical side plate 38 on threaded studs 24A and 24C. Likewise, vertical side plate 40 is slidably received by threaded studs 24B and 24D and is adjustable upward and downward along studs 24B and 24D by the threaded engagement of nuts 48 with threaded studs 24B and 24D. It is easily seen that rotation of nuts 48 around studs 24 will cause upward or downward movement of vertical side plates 38 and 40 as nuts 48 are positioned within notches 46 in vertical side plates 38 and 40. The vertical adjustment of side plates 38 and 40 is illustrated by ARROWS A in FIG. 3 which illustrate the rotation or adjustment of nuts 48 around threaded studs 24B and 24D. Vertical side plate 38 is provided on the upper portion of enlarged portion 44 with flange 50 which extends toward vertical side plate 40 and substantially parallel to rear edge 27 of base 12. Likewise, vertical side plate 40 is provided on the upper portion of enlarged portion 44 with flange 51 which extends toward side plate 38 and substantially parallel to rear edge 27 of base 12. Flanges 52 and 53 are provided on the upper part of enlarged portions 42 of vertical side plates 38 and 40 respectively. Flanges 52 and 53 extend forward of side plates 38 and 40 and upwardly substantially parallel to threaded studs 24A and 24B. Flanges 52 and 53 are provided at their upper portions with apertures 54 for hinged connection to upper frame 16. Side plates 38 and 40 are further provided with a pair of slots 56 and 57 respectively. Slots 56 and 57 are open at the top portion of side plates 38 and 40 and extend longitudinally along side plates 38 and 40 with a slightly downward angle toward the forward end 26 of base 12 as best seen in FIG. 2 and 3.

Upper frame 16 is comprised of side frame members 58 and 60 and rear frame member 62 which are rigidly connected together to form a horizontal substantially U-shaped frame. Side members 58 and 60 are provided at their free end with apertures 59 and 61 respectively. Hinge pins 64 and 65 are received by apertures 54A, 59 and 54B, 61 to allow pivotal engagement of upper frame 16 with vertical side plates 38 and 40. Retaining nuts 66 and 67 are threadably engaged to the ends of hinge pins 64 and 65 to retain them in engagement with upper frame 16 and flanges 52 and 53. Rearward extensions 68 and 69 are rigidly connected to frame member 62 and extend rearward therefrom for pivotal connection to a handle to be later discussed.

Upper cracking plate 18 is preferably constructed of a rigid material such as wood and is also provided with a textured surface not shown on its lower surface to provide a gripping action on the nuts to be cracked during the cracking operation thus assuring rolling motion of the nuts while being cracked. Upper cracking plate 18 is slidably engaged at its forward end with upper frame 16 by retainers 70 rigidly fastened by screws or the like along each side of upper cracking plate 18 and substantially adjacent the forward end thereof. Retainers 70 are provided with curved lip portions 72 which slidably engage frame members 58 and 60 of upper frame 16 allowing movement of upper cracking plate 18 along the length of frame members 58 and 60. Upper cracking plate 18 is maintained in its substantially parallel and sliding relationship to upper frame 16 by rigid connection to means 22, for causing movement of upper cracking plate 18, at the rear end of upper cracking plate 18.

Means 22 for causing movement of upper plate 18 relative to upper frame 16 is comprised generally of U-shaped extender 74, connector rods 76 and handle 80. U-shaped extender 74 is horizontally positioned with its open end facing the rear end 27 of base 12. U-shaped extender 74 is rigidly attached by screws or the like to the rear end of upper cracking plate 18. U-shaped extender 74 is hingedly connected to vertical connector rods 76 by hinge pins 75, only one of which is shown. Vertical connector rods 76 are rigidly connected at their upper ends to transverse bar 77 to form a substantially inverted U-shaped member. Transverse bar 77 is pivotally engaged at either end to rearward extensions 68 and 69 by pivotal connections 78, only one of which is shown. Handle 80 is rigidly connected at substantially the center of transverse bar 77 and extends rearwardly therefrom. A handle extension 81 is provided to ensure that the necessary leverage is available during cracking operations. Handle extension 81 is a hollow rigid member and adapted to slide over handle 80. As seen in FIGS. 2 and 3, when handle 80 is in its uppermost position, U-shaped extender 74 causes upper cracking plate 18 to move toward the rear end 27 of base 12. When handle 80 is deflected downward, the interaction of U-shaped extender 74 with connector rods 76, transverse bar 77 and rearward extensions 68 and 69 cause forward movement of cracking plate 18.

Upper cracking plate 18 is engaged in slots 56 and 58 of vertical side plates 38 and 40 by bushings 82 engaged on lugs not shown positioned on each side of upper cracking plate 18 so that they engage with slots 56 and 58 of vertical side plates 38 and 40. Only two of bushings 82 are illustrated but it can be easily seen that a second pair of bushings 82 is provided on the opposing side of upper cracking plate 18 for engagement in slots 56 of vertical side plate 38. Heads 83 prevent bushings 82 from sliding off the lugs and out of slots 56, 57.

Figure 5:
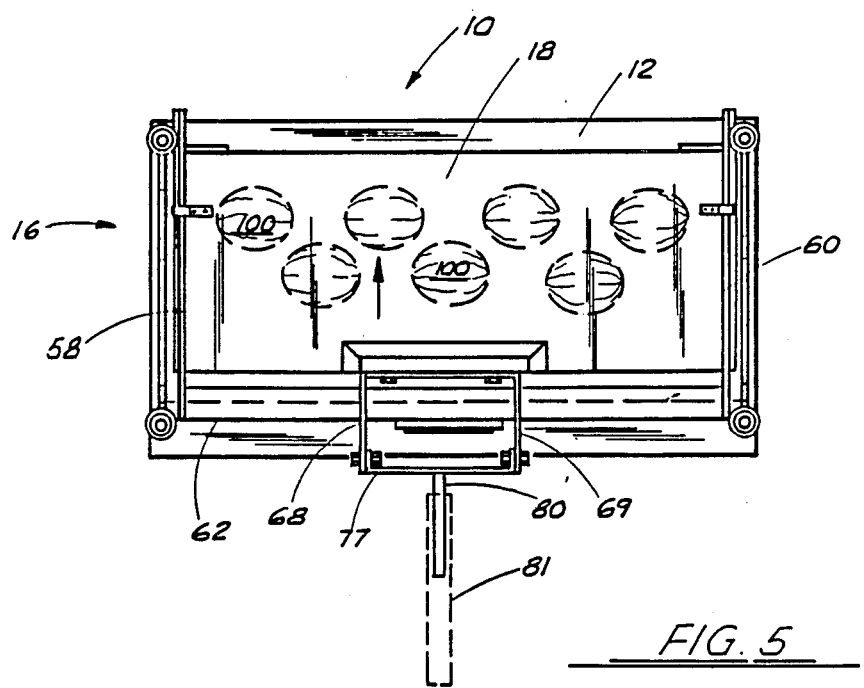
FIG. 5 is a top view of the invention illustrating the horizontal movement of the upper cracking plate during cracking operations.

As best seen in FIGS. 2 and 3, the engagement of bushings 82 in slots 56 and 57 cause downward movement of upper cracking plate 18 as it moves forward due to downward motion of handle 80. This forward and downward motion of upper cracking plate 18 provides increased pressure on nuts 100 to be cracked and also provides a rolling motion to nuts 100 thus providing cracking action along substantially the entire circumference of nuts 100. The rolling motion applied to nuts 100 is best illustrated by the ARROWS in FIG. 3. The forward motion of upper cracking plate 18 is best illustrated in the top view in FIG. 5.

The rearward motion of upper cracking plate 18 is limited by stop 86. Stop 86 may be constructed of wood or metal and extends upwardly and along the rear edge of upper cracking plate 18. Stop 86, during the rearward motion of upper cracking plate 18 comes into contact with frame member 62 thus limiting the rearward motion of upper cracking plate 18 during lifting motion of handle 80.

Figure 4:
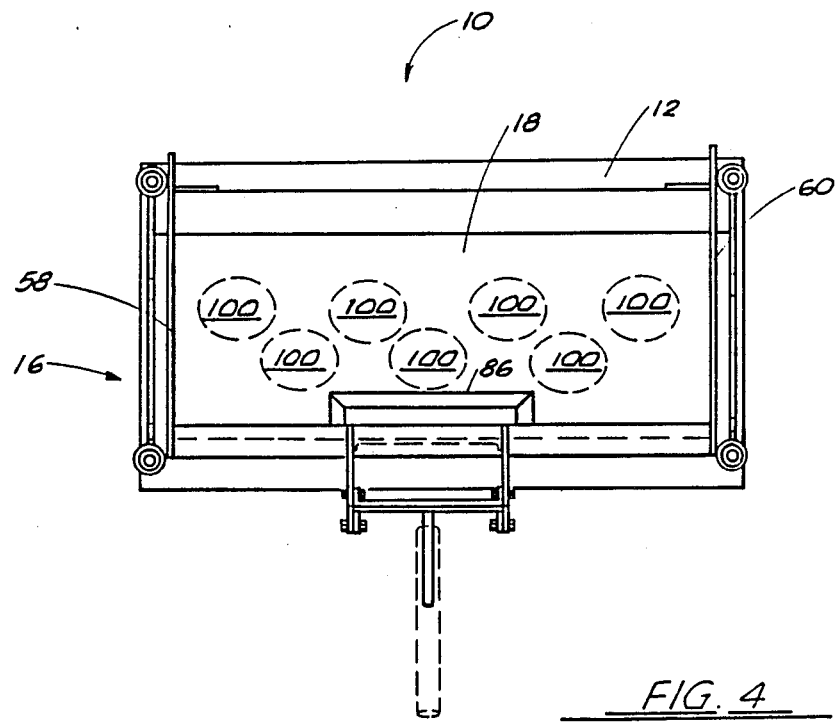
FIG. 4 is a top view of the invention illustrating the positioning of nuts between the upper and lower cracking plates prior to the cracking operation.

In operation, the user of apparatus 10 would lift handle 80, causing rearward movement of upper cracking plate 18 so that bushings 82 are aligned with the portion of slots 56 and 57 which allow disengagement of bushings 82 with slots 56 and 57. Upper frame 16 and upper cracking plate 18 may then be pivoted upward by the pivotal connection at the forward end of frame members 58 and 60. Nuts 100 are then placed on lower cracking plate 14 as illustrated in FIG. 2 and 4. Upper frame 16 and lower frame 18 are then lowered so that bushings 82 are in engagement with slots 56 and 58. If necessary, the height of upper frame 16 and upper frame cracking plate 18 may be adjusted by rotation of nuts 48 as illustrated in FIG. 3. The operator of apparatus 10 then causes downward pressure to be placed on handle 80 or handle extension 81 as illustrated by the ARROW in FIG. 3. This downward pressure causes forward and downward motion of upper cracking plate 18 through interaction with U-shaped extender 74, connector rods 76, transverse bar 77, and rearward extensions 68 and 69. The downward motion of upper cracking plate 18 is provided by bushings 82 following the downward angulated slots 56 and 57. The forward and downward motion of upper cracking plate 18 causes an increase in pressure on nuts 100 and also a rolling motion to be created by the horizontal movement of upper cracking plate 18. The textured surface 36 on lower cracking plate 14 provides gripping action so that nuts 100 do not slide but roll and cause cracking of nuts 100 around the entire circumference of the nuts. Handle 80 is then brought to its upward position as illustrated in FIG. 2 and upper frame 16 and upper cracking plate 18 pivoted upwardly to allow removal of cracked nuts 100 and the process may then be repeated.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A nutcracker apparatus, comprising:
   a. a base;
   b. a lower cracking plate removably positioned on said base;
   c. a lower frame connected to said base, comprising:
      i. a threaded stud rigidly attached adjacent each corner of said base and extending upwardly therefrom; and
      ii. a pair of slotted side rails adapted to threadably engage at least two of said studs in parallel relation to each other for vertical adjustment of said side rails on said studs relative to said base and adapted to pivotally receive said upper frame;
   d. an upper frame pivotally engaged at its forward end to said side rails, said upper frame movable between a first inoperative position and a second operative position;
   e. an upper cracking plate slidably engaged with said upper frame, movable between a first inoperative position and a second operative position; and
   f. means for moving said upper cracking plate between said first and said second positions.

2. The apparatus of claim 1, wherein said upper frame comprises:
   a. a pair of substantially parallel side frame members pivotally engaged at their forward ends to said lower frame; and
   b. a rear frame member rigidly connected at the rear end of each of said side frame members, defining a substantially U-shaped frame.

3. The apparatus of claim 1, wherein said upper cracking plate moves in a horizontal and vertical plane when moving between said first and second positions.

4. The apparatus of claim 1, wherein said means for moving said upper cracking plate comprises:
   a. an extension member rigidly connected to the rear of said upper frame and extending rearwardly therefrom;
   b. a handle pivotally connected to said extension member;
   c. an extender rod rigidly connected to the rear of said cracking plate and extending rearwardly therefrom substantially below and parallel to said extension member; and
   d. a connecter rod rigidly connected at its upper end to said handle and pivotally engaged at its lower end to said extender rod, causing forward and rearward movement of said upper cracking plate when said handle is lowered and raised.

5. A nutcracker apparatus, comprising:
   a. a base;
   b. a lower cracking plate removably positioned on said base;
   c. a threaded stud rigidly attached adjacent each corner of said base and extending upwardly therefrom;
   d. a pair of slotted side rails adapted to threadably engage at least two of said studs in parallel relation to each other for vertical adjustment on said studs relative to said base;
   e. a substantially U-shaped upper frame pivotally engaged at its forward end with said slotted side rails, said upper frame movable between a first inoperative position and a second operative position;
   f. an upper cracking plate slidably engaged with said upper frame, movable between a first inoperative position and a second operative position;
   g. means for moving said upper cracking between said first and second positions, comprising:
      i. an extension member rigidly connected to the rear of said upper frame and extending rearwardly therefrom;
      ii. a handle pivotally connected to said extension member;
      iii. an extender rod rigidly connected to the rear of said upper cracking plate and extending rearwardly therefrom substantially below and parallel to said extension member; and
      iv. a connecter rod rigidly connected at its upper end to said handle and pivotally engaged at its lower end to said extender rod, causing forward and rearward movement of said upper cracking plate when said handle is lowered and raised.

6. The apparatus of claim 5, wherein said slots in said side rails are angled downwardly toward the forward end of said side rails.

7. The apparatus of claim 6, wherein said upper cracking plate further comprises lugs extending from the sides thereof adapted to be received by said slotted side rails, guiding said upper cracking plate between said first and second positions in a horizontal and vertical motion.

8. The apparatus of claim 5, wherein said lower cracking plate further comprises an upper surface which is textured, providing a gripping action to the nuts being cracked.

9. The apparatus of claim 5, further comprising a stop rigidly attached to the upper rear portion of said upper cracking plate limiting rearward motion of said upper cracking plate when said handle is raised.

* * * * *